United States Statutory Invention Registration [19]

[11] Reg. Number: H920

Carson, Jr. et al. [43] Published: May 7, 1991

[54] METHOD OF REMOVING CESIUM FROM STEAM

[75] Inventors: Neill J. Carson, Jr., Clarendon Hills; Robert A. Noland, Oak Park; Westly E. Ruther, Skokie, all of Ill.

[73] Assignee: The United States of America as represented by the United States Department of Energy, Washington, D.C.

[21] Appl. No.: 478,329

[22] Filed: Feb. 12, 1990

[51] Int. Cl.[5] ..... G21C 19/42

[52] U.S. Cl. ..... 376/313; 376/310; 376/312; 376/314; 376/316; 376/331; 252/629; 252/630

[58] Field of Search ..... 376/313, 310, 312, 314, 376/316, 331; 252/629, 630

[56] References Cited

U.S. PATENT DOCUMENTS

| | | | |
|---|---|---|---|
| 4,333,847 | 6/1982 | Tran et al. | 252/629 |
| 4,544,499 | 10/1985 | Tran et al. | 252/629 |
| 4,587,083 | 5/1986 | Colburn | 376/313 |

OTHER PUBLICATIONS

U.S. Patent Application Ser. No. 256,812 by Siemer and Louis.

*Primary Examiner*—Brooks H. Hunt
*Assistant Examiner*—Meena Chelliah
*Attorney, Agent, or Firm*—Hugh W. Glenn; Robert J. Fisher; William R. Moser

[57] ABSTRACT

Method for removal of radioactive cesium from a hot vapor, such as high temperature steam, including the steps of passing input hot vapor containing radioactive cesium into a bed of silicate glass particles and chemically incorporating radioactive cesium in the silicate glass particles at a temperature of at least about 700° F.

16 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF REMOVING CESIUM FROM STEAM

CONTRACTUAL ORIGIN OF THE INVENTION

The U. S. government has rights to this invention pursuant to contract No. W-31-109-ENG-38 between the U.S. Department of Energy and The University of Chicago representing Argonne National Laboratory.

BACKGROUND OF THE INVENTION

The present invention relates to a method for removing radioactive cesium from a vapor stream. In particular, the present invention relates to a method for removing radioactive cesium from high temperature steam.

It is important to provide a method for the removal of cesium in the event of a release of radioactivity in a reactor environment. Cesium includes three radioactive isotopes of which Cs-139 has a half-life of only 9.3 minutes. However, two other isotopes of cesium have an intermediate half-life. Cs-133 has a half-life of about 12 years, and Cs-137 has a half-life of about 30 years. Accordingly, a release of radioactive cesium will contaminate equipment and the plant facility for a long time.

Sufficient radioactive cesium may be released by the failure of fuel rod cladding in nuclear power reactors, such as boiling water reactors and pressurized water reactors, to create hazardous conditions which limit access to the reactor facility by the plant personnel. In some instances, the radioactive cesium may be transferred and transported by steam or some other vapor medium to various remote locations in the plant facility and thereby increase the area of concern for personnel safety.

Inorganic zeolites were successfully used to completely remove the radioactive cesium from the primary water at the TMI-2 plant subsequent to the well-known accident which had contaminated that water at Three-Mile Island. The removal, however, was from water at ambient temperatures, and not from high temperature steam. Furthermore, the zeolites break down physically in steam so as to release loose powders capable of plugging filters and other equipment downstream of the zeolite. Organic materials such as ion exchange resins are also capable of removing cesium ions, but they are damaged by radiation, thereby making them also unacceptable for removing radioactive cesium from a hot vapor such as 750° F. steam.

Cesium and its compounds are volatile at temperatures above 700° F., and are not easily removed in a demisting device or an aerosol filter. It appears in the hot steam as CsI and CsOH species.

Accordingly, it is an object of the present invention to remove the various isotopes of cesium from a hot vapor stream either by chemical combination or by physical combination, or by both.

It is another object of the present invention to remove the various isotopes of cesium from a hot vapor, such as 750° F. steam, in the various forms in which the cesium could exist.

It is yet another object of the present invention to remove the various forms of radioactive cesium from a high temperature vapor stream, such as steam, in a bed of particulate matter which will retain the radioactive cesium.

It is a further object of the present invention to achieve the removal of radioactive cesium from a high temperature vapor stream in a bed of particulate matter which has a physical form that will produce an acceptably low pressure drop when placed inside of a closed vapor system, such as a steam circulating system.

It is a still further object of the present invention to provide a bed of particulate matter for the removal of cesium from high temperature steam which has physical integrity in the dynamic high temperature steam system, so that the bed will not break up to release powdery substances which could plug filters and other equipment within the steam piping system.

It is an additional further object of the present invention to provide a particulate matter which will remove radioactive cesium from high temperature steam, whereby the particulate matter will withstand breakdown, both physical and chemical, under the intense gamma radiation emitted by the radioactive isotopes of cesium and other fission product isotopes present in the circulating steam system.

These and other objects of the invention, as well as the advantages thereof, will become clear from the disclosure which follows.

SUMMARY OF THE INVENTION

The foregoing objects of the present invention are achieved by a method for removing radioactive cesium from a hot vapor, such as steam, by a technique wherein the cesium chemically reacts with a filtering material which retains the cesium without causing degradation of the filtering material. The method is carried out at temperatures in the range of from about 700° F. to about 1,000° F. and even higher, but it preferably is utilized at a temperature of at least about 800° F. The method uses a silica glass which is preferably in the form of spheres as the filter material. The preferred material is a borosilicate glass (Pyrex). The degree of removal of the radioactive cesium from the hot steam or other vapor approaches 90 to 100%.

Accordingly, the present invention comprehends a method for the removal of radioactive cesium from a vapor stream which includes the steps of passing an input vapor stream containing radioactive cesium into a bed of silicate glass particles at a temperature of at least about 700° F. At least a portion of the cesium is chemically incorporated in silicate glass particles, and an output vapor stream is withdrawn from the bed of silicate glass particles which contains a reduced content of radioactive cesium.

As pointed out, it is particularly preferred that the silicate glass particles comprise a borosilicate glass and that they be in the form of spheres. In addition, it is preferred that the bed of silicate glass particles be maintained at a temperature of at least about 700° F., and it is particularly preferred that the temperature be at least about 800° F.

A clearer understanding of the present invention will be obtained from the disclosure which follows.

DESCRIPTION OF THE PREFERRED EMBODIMENTS

Safety experiments were conducted in which there was a need to prevent fission-product cesium from spreading into unshielded but confined portions of the experimental hardware. The experiments were water-reactor safety experiments in which preirradiated, zircaloy-clad, uranium oxide fuel elements were intentionally caused to fail in a steam environment at 750° F. in order to study the migration of fission-product aerosols following cladding failure. Only part of the experimental apparatus was intended to become contaminated, and the remainder was to remain clean and be reusable. After cladding failure induced in Tests No. 1 and 2, the radioactive cesium thus released to the high temperature steam was carried into the reusable section of the system, thereby severely complicating the post-test handling of the experimental hardware.

In these first two experiments, stainless steel wire mesh filters (demisters) were provided to hold back the fission-product aerosols. However, they failed to retain all of the fission products carried by the high temperature steam, particularly the cesium isotopes. Thus, post-test disassembly had to be conducted from behind heavy lead shielding. Accordingly, the wire mesh demisters alone did not do the job, even though the cesium which was most likely present in the steam was CsOH, which is a liquid at the operating conditions of the experiment (750° F. steam).

Following the first experiment with its extensive spread of radioactive cesium within the closed experimental system, it was recognized that a material must be discovered which would be capable of removing the cesium isotopes from the steam system during test work either by chemical combination or physical combination, or both. When found, it was intended to insert this material, in suitable form, within the circulating system where it could make contact with the 750° F. steam before it entered the reusable components.

Accordingly, it was necessary to examine experimentally a number of materials which on theoretical considerations might meet certain necessary criteria, as defined by the objects set forth hereinabove. Testing was done in an apparatus which was believed to be fairly prototypic of a conventional nuclear reactor system. A number of materials were tested, including stainless steel demisting cloth, silicon carbide, crushed quartz, vitreous carbon, crushed borosilicate glass (Pyrex), borosilicate glass beads, glass wool, and a zeolite. All of these materials were found to be capable of removing some of the cesium from the steam.

Of these materials, borosilicate glass in the form of solid spherical beads best met the requirements, but only when the beads were heated to about 700° F., and preferably to about 800° F. and higher. The excellent behavior of the borosilicate glass is believed to arise because the cesium forms a stable silicate by combining with the elements in the glass under the test conditions, and also because the cesium and/or its compounds condenses on the exposed glass surfaces.

Based upon these results, it was decided to deploy glass beads in the main filter of stainless steel wire mesh (the demister) in the primary steam exit line in the hardware which was utilized in the Tests No. 1 and 2. To make the demister more effective, it was modified to include a bed of 3 mm diameter Pyrex balls or beads which surrounded the stainless steel wire mesh demister. The steel demister element was exactly the same as that used in the two earlier tests. The borosilicate balls were installed so that the effluent steam passed first through the balls and then through the wire mesh demister element. This test work indicated that the removal of the radioactive cesium from the hot steam approaches 90 to 100%.

It is believed that this method of stripping fission products from a high temperature vapor medium, such as steam, is unique. Certainly, the use of borosilicate glass, a dense, solid substance, as an agent that acts to combine chemically is unique and not obvious, since glass is normally used because of its inertness to the materials with which it comes in contact. Thus, the practice of the present invention exploits a rare instance where the glass is used deliberately as a chemical reactant. Although the chemical reaction between the radioactive cesium and the silica in the glass is fairly rapid at 700° F., it is preferable that the temperature be at least about 800° F., or even higher, in order to provide for enhanced penetration of the cesium into the borosilicate glass spherical beads in order to achieve a more complete removal of the cesium from the high temperature steam. Clearly, however, the temperature must not be allowed to reach the melting point of the glass beads.

It is felt that the method of this invention has application to the steam systems of commercial light water cooled power reactors, particularly those in which the system steam can become contaminated with radioactive cesium due to the breaching of the fuel element cladding. It is contemplated that the inventive method can be utilized as a means for continually cleaning the circulating high temperature steam of radioactive cesium by locating a filter apparatus containing the silica glass spheres at one or more locations in the plant piping of the circulating high temperature steam. Thus, the use of this invention can maintain or improve safety at a nuclear reactor plant by keeping the radioactivity within the circulating high temperature steam at a low level.

In light of the foregoing disclosure, further alternative embodiments of the inventive method for the removal of radioactive cesium from high temperature vapors will undoubtedly suggest themselves to those skilled in the art. It is thus intended that the disclosure be taken as illustrative only, and that it not be construed in any limiting sense. Modifications and variations may be resorted to without departing from the spirit and the scope of this invention, and such modifications and variations are considered to be within the purview and the scope of the appended claims.

The invention claimed:

1. Method for the removal of radioactive cesium from a vapor stream which comprises:

(a) passing an input vapor stream containing radioactive cesium into a bed of silicate glass particles at a temperature of at least about 700° F.;

(b) chemically incorporating at least a portion of the radioactive cesium in said silicate glass particles; and (c) withdrawing an output vapor stream containing a reduced content of radioactive cesium from said bed.

2. Method according to claim wherein the temperature of the vapor and the bed of silicate glass particles is at least about 800° F.

3. Method according to claim 2 wherein the silicate glass particles comprise borosilicate glass.

4. Method according to claim 3 wherein the glass particles are in the form of spheres.

5. Method according to claim 1 wherein the silicate glass particles comprise borosilicate glass.

6. Method according to claim 5 wherein the glass particles are in the form of spheres.

7. Method according to claim 1 wherein the cesium forms a stable silicate by combining with silica in the glass.

8. Method according to claim 1 wherein said cesium is present in said vapor in a form selected from the group consisting of CsI, CsOH, and mixtures thereof.

9. Method for the removal of radioactive cesium from steam which comprises:

(a) passing input steam containing radioactive cesium into a bed of silicate glass particles;

(b) chemically incorporating at least a portion of the radioactive cesium in said silicate glass particles at a temperature of at least about 700° F.; and (c) withdrawing output steam containing a reduced content of radioactive cesium from said bed.

10. Method according to claim 9 wherein the temperature of the steam and the bed of silicate glass particles is at least about 800° F.

11. Method according to claim 10 wherein the silicate glass particles comprise borosilicate glass.

12. Method according to claim 11 wherein the glass particles are in the form of spheres.

13. Method according to claim 9 wherein the silicate glass particles comprise borosilicate glass.

14. Method according to claim 13 wherein the glass particles are in the form of spheres.

15. Method according to claim 9 wherein the cesium forms a stable silicate by combining with silica in the glass.

16. Method according to claim 9 wherein said cesium is present in said steam in a form selected from the group consisting of CsI, CsOH, and mixtures thereof.

* * * * *